Nov. 29, 1966 J. H. ROWEN 3,289,114

TAPPED ULTRASONIC DELAY LINE AND USES THEREFOR

Filed Dec. 24, 1963

INVENTOR
J. H. ROWEN
BY Roy M. Porter Jr.
ATTORNEY

United States Patent Office 3,289,114
Patented Nov. 29, 1966

3,289,114
TAPPED ULTRASONIC DELAY LINE AND USES THEREFOR

John H. Rowen, Florham Park, N.J., assignor to Bell Telephone Laboratories, Incorporated, New York, N.Y., a corporation of New York
Filed Dec. 24, 1963, Ser. No. 333,022
15 Claims. (Cl. 333—30)

This invention relates to ultrasonic delay lines and more particularly to a tapped ultrasonic delay line having a plurality of output connections that are either acoustically or electrically separate or both acoustically and electrically separate from each other.

Several forms of tapped ultrasonic delay lines have heretofore been used in the art as means for deriving a plurality of time related output pulses from a single input pulse. These tapped delay lines generally comprised separate ultrasonic transducers of suitable design spaced along an ultrasonic delay medium. Both piezoelectric and magnetostrictive transducers operating in either compressive, shear or torsional ultrasonic modes have been used. For the simple uses intended, these multiple transducer taps have been satisfactory Recently, however, it has been recognized that tapped delay lines have the potential for producing complicated time versus frequency modifications of an ultrasonic wave and in other ways serving as frequency selective transmission systems when the taps are closely spaced and this spacing is varied according to a specific function. At the high frequencies presently of interest separate multiple transducers have proven too large and bulky and the bonds required to fasten them to the delay line too unreliable to provide satisfactory operation with any but the simplest kind of tap distribution.

It is therefore an object of the present invention to improve multiple tap delay lines.

It is a further object to eliminate separate output transducers from multiple tap ultrasonic delay lines.

It is a related object to modify the delay time versus frequency relationships in an ultrasonic wave.

In accordance with the invention these and other objects are accomplished by employing as the delay path a material that is not only suitable as an ultrasonic propagation path but one that also exhibits piezoelectric properties. A plurality of electrodes each comprising one terminal of an output tap are distributed on one surface of the delay path along the direction of propagation, suitable electrode means being formed upon the opposite surface to serve as the other terminal. It has been recognized in accordance with the invention that in order for such an array of electrodes to detect an ultrasonic wave propagating past them, the wave must be accompanied by components of particle displacement in a direction relative to the piezoelectric axes of the material forming the delay medium such that a piezoelectric field is generated normal to the plane of the electrodes. Furthermore, this wave should be one that is nondispersive, that is, it should have the same velocity of propagation for all frequencies.

Special features of the invention therefore reside in the use of and the means for producing a Rayleigh surface wave upon the surface containing the multiple electrodes. This mode is unique among all the customarily employed nondispersive modes of ultrasonic propagation in providing the required relationship between particle displacements and direction of propagation.

Other features of the invention reside in the manner in which a plurality of electrodes are acoustically separated from each other according to various functions and electrically connected to each other to produce bandpass filter characteristics, delay versus frequency characteristics that may be uniform with frequency or may vary with frequency according to any desired function, and amplitude transfer characteristics that vary with frequency according to any desired function.

These and other objects and features, the nature of the present invention and its various advantages, will appear more fully upon consideration of the specific illustrative embodiments shown in the accompanying drawings and described in detail in the following explanation of these drawings.

Figures 1, 2:
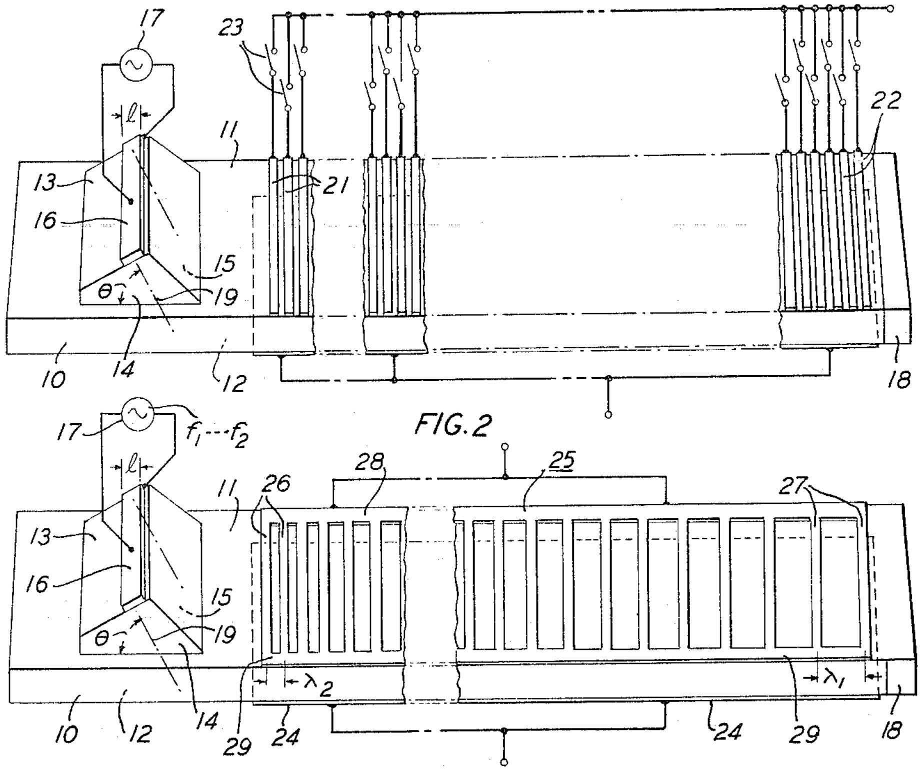
FIG. 1 is a perspective view of an illustrative embodiment having multiple taps uniformly spaced from each other in accordance with the invention.
FIG. 2 is a perspective view of another illustrative embodiment of the invention having multiple taps spaced according to a desired function and electrically connected together.

Referring more particularly to FIG. 1 an illustrative embodiment of the invention is shown comprising a section of delay line 10 in the form of a rectangularly cross-sectioned bar of any suitable ultrasonic propagation material having piezoelectric properties. For example, section 10 may be formed of a suitably cut quartz crystal, ADP or cadmium sulfide or other piezoelectric materials or sodium potassium niobate, barium titanate, or other poled ferroelectric ceramics.

Means are provided at the left-hand end of line 10 for launching a multifrequency wave of ultrasonic wave energy propagating therein as a Rayleigh surface wave along a path adjacent to and substantially parallel to surface 11 and parallel to the longitudinal axis of line 10. As illustrated, this means comprises an electrical source 17 of signals applied to a conventional piezoelectric crystal or ceramic transducers 16 bonded to end face 13 of a wedge 14. Wedge 14 is preferably formed from a medium having an elastic wave acoustical impedance which is significantly lower than that of line 10. Suitable media for this purpose are plastics and containers filled with liquids. Materials of elastic wave impedance more nearly that of line 10 may also be used if an effective impedance discontinuity is produced by interposing a viscous or liquid layer between wedge 14 and line 10. Provided this real or effective impedance difference is large the dimensions and shape of wedge 14 are not critical so long as face 13 is perpendicular to axis 19 and an opposite face 15 forms an angle $\theta$ with axis 19. Face 15 bears against and is suitably bonded to surface 11 of line 10, while transducer 16 is bonded near the top edge of face 13. The dimension $l$ of transducer 16 is limited by the above-mentioned impedance difference and if this difference is small the dimension $l$ must be limited. The angle $\theta$ between axis 19 and surface 11 is selected so that the mode of ultrasonic propagation generated by transducer 16 in wedge 14 has a velocity component parallel to surface 11 that is equal to the longitudinal velocity of the Rayleigh surface wave along line 10. A description and a mathematical analysis of this means for launching surface waves together with a mathematical analysis of the Rayleigh mode of propagation are found in the art. Reference may therefore be had to the following publications for further information:

"Surface Waves at Ultrasonic Frequencies" by E. G. Cook and H. E. Van Valkenburg, ASTM Bulletin, May 1954, pp. 81–84.

"Inspection of Metals With Ultrasonic Surface Waves" by Willard C. Minton, Nondestructive Testing, July-August 1954, pp. 13–16.

"Investigation of Methods for Exciting Rayleigh Waves" by I. A. Viktorov, Soviet Physics—Acoustics, vol. 7, No. 3, January-March, 1962, pp. 236–244.

In addition, alternative methods of launching Rayleigh surface waves as described in these publications may be used to practice the present invention although the specific form described above is preferred.

In accordance with a preferred embodiment transducer 16 is poled, provided with electrodes and suitably bonded to face 13 with the poling direction parallel to both face 13 and surface 11, and perpendicular to axis 19 so as to produce vibrations in a shear mode having an individual particle motion in the direction of poling. The angle $\theta$ is therefore equal to arc sin $v_{sur}/v_{sh}$, where $v_{sur}$ is the velocity of the surface wave of line 10 and $v_{sh}$ is the velocity of the shear wave in wedge 14.

Shear waves generated by transducer 16 travel down wedge 14 and are coupled into a Rayleigh surface wave traveling along surface 11. This wave is characterized by particle displacement components in at least two perpendicular directions, that is, normal to the electrode surface and along the direction of wave propagation. In elasticaly anisotropic materials such as quartz there is also a displacement component parallel to the surface but normal to the wave direction. The wave is further characterized by an elastic vibration whose energy is confined to a narrow region just below the free surface, and has a velocity of propagation independent of frequency (nondispersive). It was first identified by Lord Rayleigh in "On Waves Propagated Along the Surfaces of an Elastic Solid," Proceedings of London Mathematical Society, vol. 17, p. 4 (1885).

Since the particle displacement components of a surface wave vary both in the direction of propagation and in the direction normal to the surface, it follows that such a wave propagating in a piezoelectric material will be accompanied by the desired normal component of electric field for all crystallographic orientations of the piezoelectric material except one in which the only piezoelectrically active direction is normal to both the direction of wave propagation and normal to the surface. However, for a given material there will, in general, be an optimum orientation which may be determined from a knowledge of the piezoelectric and elastic constants of the material in question. A particular example in terms of quartz will be given hereinafter. First, however, it should be noted that these critical relationships between particle displacement, piezoelectric axis and electrode location, are uniquely made possible by the use of Rayleigh surface wave. All other nondispersive modes of ultrasonic propagation customarily employed in bounded structures can only produce an electric field that is parallel to the bounding surfaces and are therefore unsuitable for practicing the present invention. For example, a compressional or longitudinal plane wave has both a particle displacement and an electric field parallel to the direction of propagation. A nondispersive shear or transverse wave has a particle displacement parallel to the surface of the medium and perpendicular to the direction of propagation, and, depending upon the piezoelectric orientation, can produce electric fields along either the propagation or displacement directions, but not normal to the surface.

According to a preferred construction, line 10 comprises a single crystal of quartz formed, because of the particular anisotropy of its elastic constants, with the X or electrical axis along the direction of wave propagation and an axis in the YZ plane, different from Z, normal to the electrode surface. In quartz crystal terminology this is referred to as a rotated Y cut. For a discussion of the large number of cuts having different orientations with respect to the crystal axes of quartz together with a detailed description of the conventional designations of these cuts, reference may be had to either of the texts of W. P. Mason entitled, "Electromechanical Transducers and Wave Filters" or "Piezoelectric Crystals and Their Application to Ultrasonics," or the text of R. A. Heising entitled, "Quartz Crystals for Electrical Circuits," all published by D. Van Nostrand, Inc., of New York. In particular, the AT cut is preferred over the others because of its known low temperature coefficient of wave velocity. Thus, a crystal conforming to the AT cut is oriented so that its X or electrical axis comprises the longitudinal axis of line 10. Since the amplitude of the surface wave is maximum at surface 11 and falls off exponentially toward surface 12, it is preferable that surfaces 11 and 12 be spaced apart a plurality of wavelengths. A spacing of at least five wavelengths will prove satisfactory.

A large plurality of output electrodes 21 through 22, in a practical case numbering from several hundred to several thousand as will be explained in detail hereinafter, are located at longitudinally spaced points along surface 11. These electrodes are thin, narrow conductive strips each extending transversely across surface 11 and having a dimension parallel to the longitudinal axis of line 10 no greater than one-half wavelength. The electrodes may most simply be formed by plating the entire surface 11 with a suitable conductive material and then etching away the undesired intermediate portions. By this process the electrodes may be made of any desired size and may be spaced in any desired manner. In the embodiment illustrated the electrodes are equally spaced. Separate electrodes may also be provided on surface 12, but in the usual application of the invention, a single electrode 24 coextensive with all electrodes 21 through 22 may serve in common as a ground electrode for all taps.

In operation, electrical energy from source 17 will be converted into ultrasonic vibrations by transducer 16 which are in turn coupled into Rayleigh surface waves by wedge 14. As the surface wave passes electrode 21, the strains which it sets up in the portion of the piezoelectric material of line 10 adjacent electrode 21 causes an electric field to form between electrode 21 and ground electrode 24. The time at which this electric field occurs is precisely delayed from the initiating time by the sum of the ultrasonic travel time down wedge 14 and along line 10 to electrode 21. The same surface wave subsequently passes the remaining electrodes and is precisely reproduced by each at times corresponding to the transit time to that electrode. Any remaining energy is dissipated in an acoustical wave absorber 18 of known type located on the end of line 10 remote from the position of wedge 14. Thus, a plurality of outputs is produced that are both acoustically and electrically separate from each other. If all electrodes 21 through 22 are electrically connected together by a low impedance connection, as by closing switches 23, and in parallel with a device for utilizing the output from the electrodes, the structure becomes a bandpass filter. Since the electrodes remain acoustically spaced from each other by equal distances, the center frequency of the band is that frequency for which this spacing is one wavelength of the surface wave in line 12. Only for this frequency are the voltages from the electrodes in phase. At frequencies remote from the center frequency, the voltages from the several electrodes are of various phases and tend to add to zero and to cancel each other.

As noted above, the number of electrodes may vary from several hundred to several thousand depending upon the design requirements of any given application. In general, the number required is inversely proportional to the degree to which departure from the theoretically required characteristic can be tolerated. Thus, the number of electrodes has the same effect upon bandwidth and discrimination as does the number of filter sections in a conventional lumped constant multisection filter and design procedures familiar to the filter art are followed in designing a filter in accordance with the present invention.

Of the several important and novel uses of the invention, one is that of modifying the delay time versus frequency arrangement of the components in a broadband signal. For example, in certain signal transmission systems an intelligence signal is first dispersed, that is, the frequency components are delayed in time relative to each other according to a given relationship and after certain operations are performed by or upon this signal, it must be returned to its original time relationship or collapsed. For this purpose the output taps are spaced from each other acoustically by a distance that varies with distance along the line according to a function that corresponds to the desired frequency versus delay characteristic and electrically connected together. A preferred form of this embodiment of the invention in which the taps are initially formed with suitable low impedance electrical connection and acoustical separation is illustrated in FIG. 2. Components identical to those in FIG. 1 have been given corresponding numerals, and the modification may be seen to reside in the nature of electrode array 25 on surface 11. Array 25 is preferably formed by plating a uniform layer of conductive material on surface 11 and then etching away portions of it to leave several hundred or more similar, transversely extending conductive bars such as 26 and 27, each comprising acoustically separate electrodes, but which are electrically tied together by at least one side rail such as 28 or 29 so that all electrodes are connected in parallel to a common output impedance. The spacing between the centers of adjacent electrodes varies with distance along the length of array 25 according to the function which it is desired to reproduce as the frequency versus delay characteristic in the output energy. More particularly, this spacing at one end of electrode array 25 is equal to one wavelength of the surface wave at the highest frequency in the applied band and the spacing at the other end of the electrode is equal to one wavelength at the lowest frequency in the band. Assume, for example, that the intended dispersion characteristic is one for which delay decreases with increasing frequency according to a linear function. Then the electrode spacing nearest wedge 14 is one surface wavelength at the highest frequency $f_2$ in the band; the electrode spacing furthest from wedge 14 is one wavelength at the lowest frequency $f_1$; and the spacing there between is varied according to linear relationship. It should be understood that this spacing may be varied according to any geometric, exponential, logarithmic, or other progression if such represents the desired dispersion variation. Theoretically each electrode should have a dimension parallel to the axis of line 10 comparable to one-half its spacing but in a practical case it has been found that a uniform dimension less than one-half wavelength of the highest frequency under consideration is satisfactory and is substantially more easily formed.

Since the first several electrodes, such as 26, nearest wedge 14 are spaced very nearly one wavelength at the frequency $f_2$, the electric fields respectively detected by them are substantially in phase and an electrical output is produced representative of the signal $f_2$. As time passes components at the frequency $f_2$ proceed further along array 25 and the electrode spacing becomes increasingly longer than the wavelength at frequency $f_2$. Therefore, the phase of the voltage detected by each successive electrode is later than the one just preceding it and the response of one electrode tends to cancel the response of another.

For the frequency $f_1$ at the low end of the band the situation is exactly reversed. Since the wavelength is substantially greater than the electrode spacing near wedge 14, the voltages detected by each successive electrode are earlier in phase than the ones just preceding it and tend to cancel. However, as the wave continues its travel along the electrode array, the electrode spacing eventually equals the wavelength at the frequency $f_1$ and the voltage detected by adjacent electrodes is in phase to produce an output voltage.

Thus, ultrasonic energy of the frequency $f_2$ will be detected by the first portion of the electrode array, a wave of the frequency $f_1$ will be detected by the last portion of the electrode array and waves of intermediate frequencies will be detected by intermediate portions of the electrode array. Each component frequency has a time delay proportional to the distance from the input to the point where the electrode spacing equals its wavelength. The order in which the highest frequency component, the lowest frequency component, or any intermediate component is detected and the distance from the input at which this detection occurs may be arbitrarily selected by proper arrangement of electrodes to produce any desired delay characteristic.

As noted above, the number of electrodes may vary from several hundred to several thousand depending upon the design requirements of a given application. When a given dispersive delay characteristic is to be synthesized, criteria derived from the theory of sampling are used to determine a suitable approximation of a given dispersion characteristic. Thus, when the number of sampling elements, that is, the number of electrodes, is equal to the product of twice the bandwidth and the differential delay between maximum and minimum frequencies in the band, the error in delay will be less than the reciprocal of the bandwidth. In all present commercial applications, the bandwidth is less than half the center frequency. Therefore, if the number of elements is equal to the product of the center frequency and the differential delay, the error will be less than that prescribed by the theory of sampling.

Inasmuch as the different delay times for the different frequency components is actually the result of different travel paths rather than merely different travel times along the same path, a given degree of dispersion can be produced in a very much smaller structure, with much smaller average path lengths, than in the prior art dispersive delay lines. Since acoustic losses are a function of path length the present structures are more efficient than prior art lines.

The converse function is performed to collapse the band $f_1$ to $f_2$ if it is already dispersed at the time it is applied to transducer 16. To produce the complement to or the image of the dispersion characteristics specifically described above, the low frequency electrode spacing must be located nearest to the input and the higher frequency spacing remote therefrom. Therefore, an output is obtained from the electrode array 25 only when all frequency components register upon their appropriate electrodes at the same time.

While much more difficult to visualize in operation, the structures described are fully reciprocal. Thus, a multifrequency signal applied in parallel to each electrode of electrode array 25 will produce a multifrequency Rayleigh surface wave traveling away from the array with each component frequency originating as an ultrasonic wave only at that location for which the electrode spacing equals its surface wave wavelength. Qualitatively, this may be understood by recognizing that each electrode produces a piezoelectric response at all frequencies and each by itself is capable of exciting several modes of ultrasonic propagation including the Rayleigh surface wave. However, when a plurality of these electrodes are arranged in an array, only those spaced substantially one surface wave wavelength produce components that combine in phase for propagation in a given direction and all others tend to cancel in phase.

Figure 3:
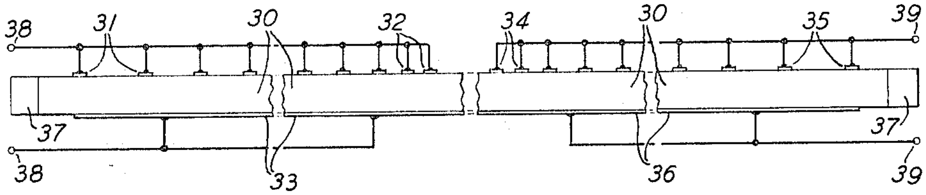
FIGS. 3 and 4 are schematic representations of alternative arrangements of multiple taps.

Since an appropriate electrode array is an effective source of Rayleigh surface waves, it may be used in the several prior art applications of surface waves as a source thereof and it may be substituted for wedge 14 and transducer 16 of FIG. 1 or FIG. 2. As illustrated schematically in FIG. 3, delay line 30 comprises a body of piezoelectric material of the type and orientation described with reference to FIGS. 1 and 2. A first array of electrodes 31–32 are arranged on one surface at one end of line 30 and has a spacing between elements that varies according to the intended dispersion characteristic. While illustrated as being electrically connected together exteriorly, electrodes 31–32 may be formed as illustrated in FIG. 2. Electrodes 31–32 are opposed by ground electrode 33. A second array of electrodes 34–35 are arranged at the other end of line 30, on the same surface as electrodes 31–32, and are opposed by a second ground electrode 36. Electrodes 34–35 are spaced according to the same function as electrodes 31–32 but in the opposite order. In the embodiment illustrated, the wide or low frequency spacing of the first array is represented by electrodes 31 and the close or high frequency spacing by electrodes 32 at the center of line 30. The close or high frequency spacing of the second array is represented by electrodes 34, also at the center, and the low frequency spacing by electrodes 35. Suitable absorbing terminations 37 are placed at each end of line 30.

Thus, if a multifrequency electrical signal is applied between terminals 38, the low frequency components thereof will be launched as an ultrasonic wave in the Rayleigh surface mode by electrodes 31 while successively higher frequency components will be launched by electrodes 32. In converse order, the high frequency components are detected by the electrodes 34 and low frequency components are successively detected as electrodes 35 are approached. Thus, a delay versus frequency characteristic that decreases with increasing frequency and which represents twice the dispersion of each array of electrodes alone is produced. The order in which the spacing is varied in both arrays may be reversed to produce a delay versus frequency characteristic that increases with increasing frequency.

Figure 4:
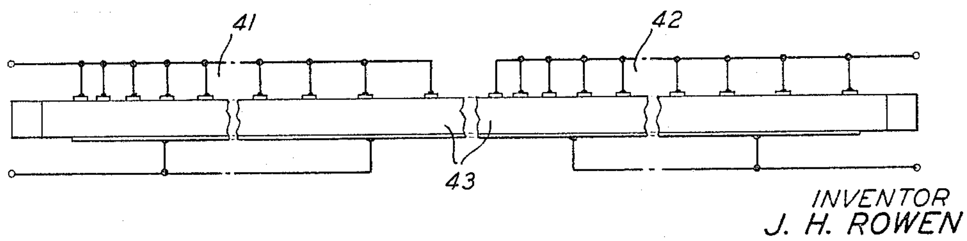

Obviously, all structures thus far described have bandpass filter characteristics in addition to their unique dispersion characteristics. The electrode array specifically illustrated in FIG. 4 takes further advantage of this filter characteristic in a nondispersive manner. Thus, two arrays of electrodes 41 and 42, each having spacings that vary according to identical functions, are located at spaced points upon piezoelectric body 43. Since the distance is the same from every pair of adjacent electrodes having a given spacing in array 41 to adjacent electrodes having a corresponding spacing in array 42, every frequency component will travel the same path length between arrays and no dispersion is introduced. Thus, the combination constitutes a nondispersive delay line of arbitrary bandwidth, the upper and lower cut-off frequencies being determined exclusively by the respective minimum and maximum electrode spacings. Furthermore, any arbitrary amplitude transfer characteristic may be introduced between the input and output terminals merely by controlling the number, size or both number and size of adjacent electrodes having a spacing of one wavelength of the surface wave at each frequency. For example, to emphasize the higher frequencies in a given band, more or larger electrodes spaced from each other approximately one wavelength at these higher frequencies are provided. The criteria for determining the number of electrodes are the same as those set forth above.

Aspects somewhat related to those of the present invention are described and claimed in the copending application of R. S. Duncan and M. R. Parker Serial No. 296,212, filed July 19, 1963 and in the copending applications of E. P. Papadakis Serial No. 333,020, and I. E. Fair and E. P. Papadakis Serial No. 333,021, now abandoned, both filed on an even date herewith.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An ultrasonic device comprising a body of piezoelectric material, means for launching within said body an ultrasonic wave having a particle displacement that is normal to one surface of said body and has a maximum amplitude at said surface that decreases with distance away from said surface, electrode means including a plurality of conductive members spaced apart on said one surface uniformly from each other by one wavelength of said ultrasonic wave for detecting a piezoelectric field normal to said surface that is generated by said particle displacement at a multiplicity of spaced points along the direction of propagation of said wave, and means for electrically connecting said conductive members together to produce an output representative of the simultaneous sum of said fields detected at said multiplicity of points.

2. An ultrasonic device comprising a body of piezoelectric material, means for launching within said body an ultrasonic wave having a particle displacement that is normal to one surface of said body and has a maximum amplitude at said surface that decreases with distance away from said surface, electrode means including a plurality of conductive members spaced apart on said one surface by distances that vary as a function of distance from said launching means for detecting a piezoelectric field normal to said surface that is generated by said particle displacement at a multiplicity of spaced points along the direction of propagation of said wave, and means for electrically connecting said conductive members together to produce an output representative of the simultaneous sum of said fields detected at said multiplicity of points.

3. The combination according to claim 2, wherein said conductive members are electrically connected together by a low impedance connection.

4. The combination according to claim 2, wherein said launching means includes a broadband source of signals and an ultrasonic piezoelectric transducer mechanically coupled to said surface, and wherein the spacing between certain adjacent conductive members on respectively different portions of said surface is one wavelength of the highest and lowest frequencies, respectively, of the energy in said band.

5. The combination according to claim 4, wherein each of said conductive members has a dimension parallel to the direction of propagation of said wave that is no greater than one-half wavelength of said ultrasonic wave.

6. The combination according to claim 4, wherein said transducer has a face that is inclined at an angle to said surface.

7. The combination according to claim 4, wherein there are several hundred of said conductive members.

8. An ultrasonic device comprising a body of piezoelectric material, means for launching within said body a Rayleigh surface wave contiguous to one surface of said body, said means including a wedge having two nonparallel faces and comprising a material having an acoustical impedance different from the acoustical impedance of said body, one of said faces being mechanically connected to said one surface, a piezoelectric transducer fastened to the other of said faces, and a plurality of spaced conductive members disposed upon said one surface for detecting the piezoelectric field generated by said wave at a multiplicity of points along the direction of propagation of said wave.

9. Means for modifying the characteristics of energy transmitted from a source of electrical signals to a device for utilizing said signals, said means comprising an elongated solid body of piezoelectric material having at least two plane surfaces transversely opposite each other, first and second arrays of spaced electrodes both located on one of said surfaces, the adjacent electrodes of each array being spaced apart by distances that vary as a function of distance along said body, further electrode means contacting the surfaces opposite said one surface, means for connecting said source in parallel between the electrodes of said first array and said further electrode means, and means for connecting said device for utilizing said signals in parallel with the electrodes of said second array and said further electrode means.

10. The apparatus according to claim 9, wherein said spacing between electrodes of both arrays varies in the same sense in a given direction along the length of said body.

11. The apparatus according to claim 9, wherein said spacing between electrodes of each array varies in opposite senses to each other in a given direction along the length of said body.

12. Means for generating a Rayleigh surface wave of ultrasonic propagation within a body of solid material, said means comprising an elongated solid body of piezoelectric material having at least two plane surfaces transversely opposite each other, an array of spaced conductive electrodes located upon one of said surfaces, an extended conductive electrode upon the other of said surfaces, and means for simultaneously applying alternating electric voltages in phase between each of a plurality of said spaced electrodes and said extended electrode.

13. The apparatus according to claim 12, wherein said array includes at least several hundred separate electrodes each having a dimension along the length of said body that is less than one-half wavelength of said ultrasonic wave at the frequency of said alternating voltage.

14. The apparatus according to claim 12, wherein said electrodes of said array are spaced from each other one wavelength of said ultrasonic wave at frequencies of said alternating voltage.

15. An ultrasonic delay device comprising an elongated body of ultrasonic propagation material having piezoelectric properties and having at least two plane surfaces transversely opposite each other, means for launching in one region on one of said surfaces a Rayleigh surface wave related to said one surface and characterized in a component of particle displacement normal to said one surface, said surfaces being spaced apart by at least five times the wavelength of said surface wave, and means for detecting said wave in a region remote from said one point on said one surface, said means for detecting comprising means including a plurality of spaced conductive electrodes disposed upon said one surface for detecting the piezoelectric field generated by said wave at a multiplicity of points along the direction of propagation of said wave.

References Cited by the Examiner

UNITED STATES PATENTS

| | | | |
|---|---|---|---|
| 2,941,110 | 6/1960 | Yando | 315—3 |
| 2,965,851 | 12/1960 | May | 333—30 |
| 3,070,048 | 12/1962 | Turner | 340—16 |
| 3,070,761 | 12/1962 | Rankin | 333—30 |
| 3,103,640 | 9/1963 | Lockhart | 333—30 |

FOREIGN PATENTS

| | | |
|---|---|---|
| 988,102 | 4/1965 | Great Britain. |

OTHER REFERENCES

ASTM Bulletin, May 1954, p. 81–84, "Surface Waves at Ultra-Sonic Frequencies," by Cook & Van Valkenburg.

ELI LIEBERMAN, *Primary Examiner.*

C. BARAFF, *Assistant Examiner.*